April 2, 1940.                T. BROWN                2,195,611
                         IMPLEMENT CONNECTION
                         Filed Dec. 18, 1937
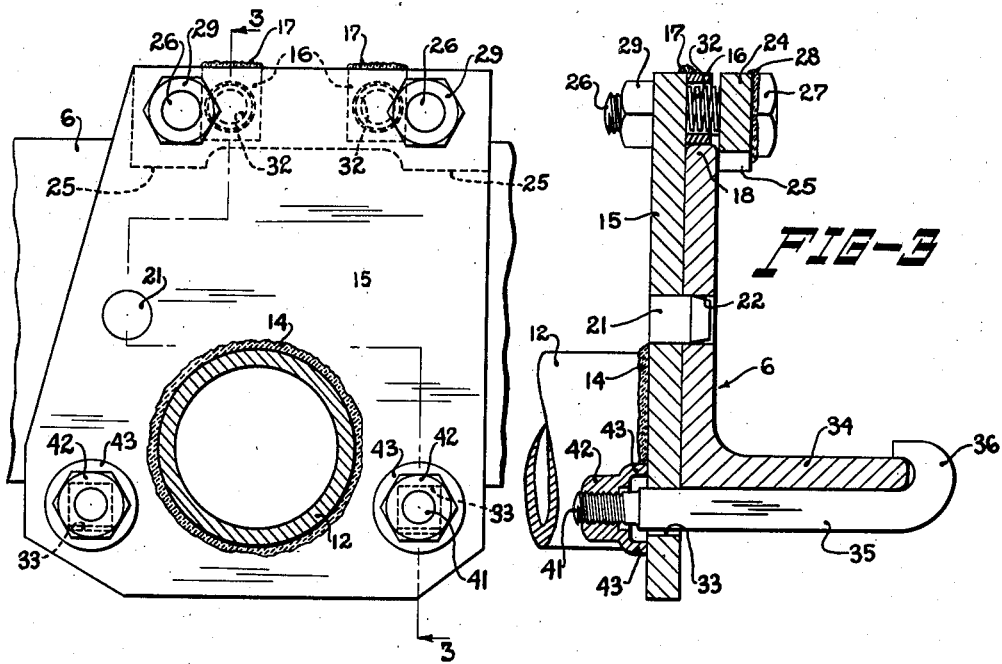
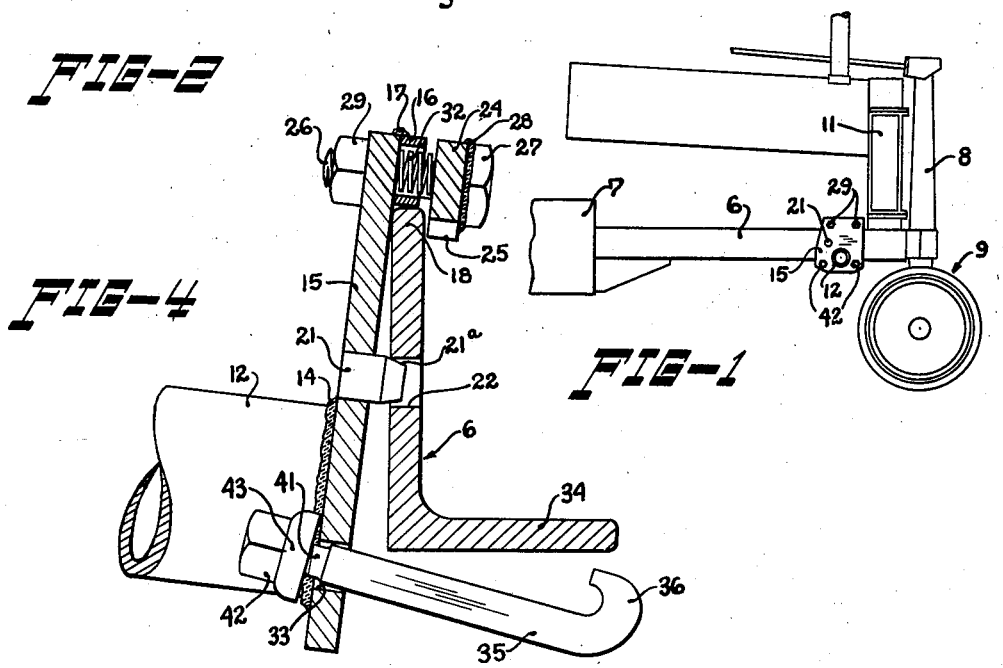
WITNESS-
N. C. Westling.
INVENTOR
Theophilus Brown
BY Brown, Jackson, Boettcher Dressen
ATTORNEYS Patented Apr. 2, 1940

2,195,611

UNITED STATES PATENT OFFICE 2,195,611

IMPLEMENT CONNECTION

Theophilus Brown, Moline, Ill., assignor to Deere & Company, Moline, Ill., a corporation of Illinois Application December 18 1937, Serial No. 180,485

19 Claims. (Cl. 97—47)

The present invention relates generally to tractor supported implement attachments and other attachable and detachable units adapted to be carried by a supporting frame or the like, and more specifically has to do with improved means for detachably connecting an implement to a tractor whereby the implement may be more easily and quickly connected to and disconnected from the tractor.

I wish it to be understood, however, that while I have illustrated my invention as applied to a tractor and shall describe the same as used in connection with attaching a cultivator rig supporting beam to such tractor, my invention is not to be limited to use with cultivator attachments and tractors, as it may be used in any other situation to which it is adapted.

An attachment of the general character to which the present invention relates is illustrated and described in Letters Patent No. 2,033,380, issued March 10, 1936, to Theodore W. Johnson, wherein is illustrated a cultivator attachment supported on the side frame member of a tractor adjacent the forward end thereof and rigidly secured in position thereon by means of a plurality of bolts and nuts. In such patented construction, however, it is necessary to completely remove the nuts and bolts when attaching the implement to the tractor or detaching it therefrom, which, of course, is inconvenient owing to the time required in so doing.

With the above in view it is the principal object of the present invention to provide improved connecting means whereby an implement attachment may be conveniently and quickly attached to and detached from a tractor without the necessity of completely removing any bolts or nuts, and whereby said attachment when in position on the tractor will be securely held in its proper position.

Another object of the invention is to provide improved means for connecting an implement attachment to a tractor wherein all the means for connecting the attachment to the tractor and securing it in fixed position thereon are carried by the attachment itself.

Other objects and advantageous features of the present invention will be apparent from the following description of the preferred embodiment of the invention taken in connection with the accompanying drawing, in which:

Figure 1 is a fragmentary side elevational view of the front end portion of a tractor with the improved means for connecting an implement attachment to the tractor in position on the side frame member or rail of the tractor;

Figure 2 is an enlarged side elevational view illustrating more in detail the connecting means mounted in position on the side frame bar of the tractor;

Figure 3 is a vertical cross-sectional view taken approximately along the line 3—3 of Figure 2 and illustrating the connecting means between the cultivator draft beam and the tractor in fixed position on the side frame bar of the tractor; and Figure 4 is a sectional view similar to Figure 3, but illustrating the connecting means in partly disassembled relation with respect to the side frame member of the tractor.

In the present application only a portion of a tractor and a portion of a cultivator draft beam or supporting member of a cultivating unit adapted to be connected to one side of a tractor have been illustrated in the drawing and will be hereinafter described, as that is all that is necessary for a full understanding of the present invention. The tractor fragmentarily shown in Figure 1 is similar to that shown in the above mentioned Johnson patent, and includes a pair of transversely spaced frame members or angle iron rails 6, one of which is shown, that are secured in any suitable manner to and extend forwardly from the motor cylinder block 7 and the main frame casting (not shown), and to each of which side rails a cultivating unit is adapted to be detachably connected. The tractor also includes a vertical steering column in which a front wheel truck 9 is journaled for rotation about a generally vertical axis. Rearwardly of the steering column 8 is a radiator 11 which rests on or between the rails 6 of the frame and is secured thereto in any suitable manner.

The cultivator draft beam fragmentarily illustrated is in the form of a cylindrical member or pipe and indicated by the reference numeral 12. The draft beam when secured in position to the side rail of the tractor by the connecting means to be hereinafter described is adapted to extend outwardly laterally from the tractor and to have a plurality of any suitable cultivating rigs, such, for example, as those shown and described in the above mentioned Johnson patent, secured thereto at suitable spaced points thereon.

Coming now to the improved means for detachably connecting the cultivator draft beam to the side rail 6 of the tractor, the draft beam has welded to its inner end, as shown at 14, or otherwise suitably secured, a vertically disposed fore and aft extending supporting plate 15 that is adapted to be connected to the angle iron side rail 6 of the tractor, and when secured in position thereon will have its inner surface lying flush against the outer surface of the vertical flange of such angle iron rail as shown in Figure 3. It may be well to explain at this point that all the means provided for supporting the attachment on the tractor and the means for securing it in fixed position thereon are all carried by the supporting plate 15, and that it is not necessary to completely disconnect any of such securing means from such supporting plate in attaching the cultivating unit to or detaching it from the tractor. This securing means includes a pair of laterally spaced collars 16 that are welded, as shown at 17, to the inner side of the supporting plate 15 adjacent its upper edge, and such collars are adapted to rest on the upper edge 18 of the vertical flange of the side rail 6 when the cultivating unit is applied to the tractor, as shown in Figures 3 and 4. A pin 21 fixed in any suitable manner in the plate 15 and extending outwardly beyond the inner surface of said plate is adapted to fit into a hole 22 formed in the vertical flange of the rail 6 about midway between the upper and lower edges of such flange, as shown in Figures 3 and 4, the end of the pin that enters the hole 22 being tapered as shown at 21a to facilitate its entry into the hole as best shown in Figure 4. The pin 21 and the collars 16 carry the vertical load of the cultivating attachment when it is in position on the tractor, and the pin 21 also serves the purpose of determining the position of the attachment and holding the supporting plate 15 against twisting relative to the tractor frame bar 6. The pin 21 also serves the purpose of preventing longitudinal movement of the attachment relative to the frame bar 6 of the tractor should the fastening means hereinafter described become loosened in use. If desired, a plurality of longitudinally spaced holes 22 may be provided in the side rail 6 of the tractor for receiving the pin 21 so that the cultivating attachment may be secured to the tractor in various positions along said side rail as desired.

The upper end of the supporting plate 15 is securely held in position against the side frame member 6 of the tractor by a clamping or securing plate 24 that is approximately rectangular in form and extends approximately the entire length of the supporting plate 15, as shown in dotted lines in Figure 2. The securing plate 24 has a pair of lugs 25 at its lower edge and is of such width that its lower marginal portion, including said lugs, overlaps the upper edge of the vertical flange of the side rail 6 of the tractor when the attachment is placed in position thereon and fixed thereto, as shown in Figures 3 and 4. The securing plate 24 is connected to and supported by the supporting plate 15 by a pair of laterally spaced bolts 26 (Figure 2) that extend through alined openings provided therefor in said plates. The heads 27 of the bolts 26 are welded, as shown at 28, to the inner side of the securing plate 24, and the bolts are held in position in the supporting plate 15 by nuts 29 threaded on to said bolts on the outer side of such supporting plate as shown. By welding the heads of the bolts to the securing plate said bolts are securely held against turning when the nuts 29 are drawn up on the bolts so that it is necessary to use only one wrench when drawing up the nuts on the bolts.

When the implement attachment is detached from the tractor frame member 6 the securing plate 24 is normally held forced away from the supporting plate 15 by a pair of compression springs 32 disposed within the collars 16 between said two plates. These springs 32 act to hold the plates spaced apart a sufficient distance so as to permit the cultivator attachment to be hung over the upper edge 18 of the vertical flange of the tractor frame bar 6, as shown in Figure 4. After the attachment has been hung in the proper position on the tractor frame bar 6 with the upper edge of the bar between the plates 15 and 24, it may be shifted longitudinally of necessary, and then the nuts 29 are tightened up on the bolts 26 to clamp the plates to such frame bar.

Supported in laterally spaced openings 33 provided in the supporting plate 15 adjacent the lower edge thereof so as to extend inwardly below the horizontal flange 34 of the side rail 6 of the tractor is a pair of bolts 35, each of which is provided with a hook portion 36 at its inner end that is adapted to be engaged over the inner edge of the horizontal flange 34 of the rail 6, as shown in Figure 3.

These hook bolts 35 are of square cross-section and the holes 33 in the supporting plate 15 are also of square cross-section so that said bolts are held against turning in said holes and are always in the proper position to be engaged over the inner edge of the horizontal flange 34 of the side rail 6. The outer ends 41 of the bolts are formed circular in cross-section and threaded to receive securing nuts 42, whereby after the hooked ends 36 of the bolts are hooked in place over the flange 34 said bolts can be drawn up tightly in place by tightening the nuts 42 to thereby securely fix the lower portion of the supporting plate 15 against the rail. As shown, the nuts 42 are each provided with an outwardly flaring skirt portion 43 that is recessed interiorly to receive the square portion of its associated bolt when the nut is tightened up on the bolt, all as shown in Figure 3.

It is believed that the operation of the means for attaching the cultivator draft bar to the tractor and detaching it therefrom will be readily apparent from the foregoing description thereof, but it may be well to briefly summarize the operation. In attaching the draft bar the operator raises the draft beam with the outer end higher than the inner end and with the latter high enough so that the securing plate clears the upper edge 18 of the vertical flange of the side rail 6 of the tractor. The operator then lowers the beam until the collars 16 come to rest on the upper edge of the beam, the springs 32 during this operation holding the securing plate 24 away from the supporting plate 15 a sufficient distance so that the upper edge of the flange will readily be received between said two plates. If the pin 21 is not in alinement with the hole 22 in the rail 6 the operator slides the attachment along the rail until the pin and hole are in alinement and then lowers the outer end and pushes the supporting plate toward the rail to insert the pin in the hole. The nuts 29 on the bolts 26 are then tightened up to draw the securing plate 24 toward the supporting plate 15 against the action of the springs 32 to thereby lock the upper end portion 18 of the rail between said plates. The nuts 42 on the hook bolts 35 are then loosened sufficiently so that the hooks 36 at the inner ends of the bolts can be hooked over the inner edge of the horizontal flange 34 of the rail 6, after which the nuts 42 are drawn up to lock the hook bolts 35 securely in position on the horizontal flange and draw the lower portion of the supporting plate up flush against the vertical flange of the rail 6. In detaching the cultivator unit the nuts 42 are first loosened sufficiently to permit the hook bolts to be unhooked from the rail, and then the nuts 29 on the bolts 26 are loosened sufficiently to unlock the plates 15 and 24 from the rail 6, after which the cultivator unit may be removed, as will be readily understood.

It will be seen from the foregoing that by the means described a construction has been provided whereby cultivator units or other attachments may be quickly and easily connected to and disconnected from a tractor with a minimum of effort and without the necessity of completely removing any of the bolts or nuts that are used for fixedly securing the attachment in place on the tractor.

While I have shown and described above the preferred form in which the principles of the present invention have been embodied, it is to be understood that the present invention is not to be limited to the specific details shown and described above, but that, in fact, widely different means may be employed in carrying out the broader aspects of my invention.

I claim:

1. In an implement, a draft bar, a connecting plate secured adjacent the inner end thereof, a clamping plate movably carried adjacent the upper edge of said connecting plate and extending downwardly therefrom a distance substantially less than the vertical dimension of said plate, and separate clamping means carried at the lower edge of said plate.

2. In an implement, a draft bar, a connecting plate secured adjacent the inner end thereof, a clamping part movably carried adjacent the upper edge of said connecting plate and extending downwardly from the upper edge thereof a relatively small amount, and frame engaging means between said plate and said clamping part and disposed above the lower edge of said clamping part, the limited downward extension of said clamping part below said frame engaging means providing for the application of said draft bar and said connecting plate to bring said frame engaging means into engagement with a frame while said clamping plate is attached to said connecting plate.

3. In an implement, a draft bar, a connecting plate secured adjacent the inner end thereof substantially at right angles to said bar, a clamping part movably carried adjacent the upper edge of said connecting plate, and spring means acting to move said clamping part away from said plate.

4. In an implement, a draft bar, a connecting plate secured adjacent the inner end thereof, a clamping plate movably carried adjacent the upper edge of said connecting plate, a bolt having a head fixed to one of said plates and extending through an aperture in the other plate for moving the clamping plate toward said connecting plate, and a hook bolt loosely carried by the lower portion of said connecting plate and movable with respect thereto to provide for applying said connecting plate to an implement frame without detaching said clamping plate at the upper edge of said connecting plate.

5. In an implement, a draft bar, a connecting plate secured adjacent the inner edge thereof, a clamping plate movably carried adjacent the upper edge of said connecting plate, a pair of bolts extending through apertures in the connecting plate adjacent its upper edge and having their heads fixed to said clamping plate, and a hook bolt loosely carried by the lower portion of the connecting plate.

6. The combination with a frame member, of means for detachably connecting a second member to said frame member comprising a plate secured to said second member and having means adapted to engage over the upper edge of said frame member, means carried by said plate and engaging over the lower edge of said frame member, and cooperating means on said members separate from said engaging means for holding said members against longitudinal movement relative to each other.

7. The combination with a frame member, of means for detachably connecting a second member to said frame member comprising a plate secured to said second member and having means adapted to engage over the upper edge of said frame member, means carried by said plate and engaging over the lower edge of said frame member, and means carried by said plate and extending through an opening in said frame member for holding said second member against longitudinal movement relative to said frame member.

8. The combination with a frame member, of means for detachably connecting a second member to said frame member comprising a plate secured to said second member and having means adapted to engage over the upper edge of said frame member, means securing said plate to the lower portion of said frame member, and means carried by said plate and extending through an opening in said frame member for holding said second member against longitudinal movement relative to said frame member.

9. The combination with a frame member having a generally vertically extending portion and a generally horizontal portion extending inwardly therefrom, of means for detachably connecting a second member to said frame member comprising a plate secured to said second member, a part carried thereby and having a downwardly extending section spaced from said plate and adapted to hook over the upper edge of the vertically extending portion of said frame member, and a second part carried by said plate and having a hook-like section adapted to engage both the upper and lower sides of the inner edge of the horizontally extending portion of said frame member.

10. The combination with an angle iron frame member comprising a vertically extending flange and a horizontal flange extending inwardly therefrom, of means for detachably connecting a second member to said frame member comprising a plate secured to said second member and having means adapted to engage over the upper edge of the vertically extending flange of said frame member, means carried by said plate and engaging over the inner edge of the horizontally extending flange of said frame member, and a pin fixed in said plate and extending through an opening in the vertical flange of said frame member for holding said second member against longitudinal movement relative to said frame member.

11. The combination with a tractor having a frame member, of an attachment comprising a generally laterally extending supporting member, a supporting plate adapted to extend fore and aft of and secured to said supporting member at substantially right angles, a pair of fore and aft spaced collars secured to the inner face of said supporting plate and adapted to rest on the upper edge of said frame member, a pair of fore and aft spaced bolts carried by said supporting plate, a securing plate carried by said bolts inwardly of said collars and adapted to engage the inner face of said frame member below the upper edge thereof, and a nut threaded on the outer end of each of said bolts on the outer side of said supporting plate whereby by tightening said nuts said plates may be drawn toward each other to tightly clamp the frame member between them.

12. The combination with a tractor having a frame including angle iron side frame members comprising a vertically extending flange, of an attachment comprising a generally laterally extending supporting member, a supporting plate adapted to extend fore and aft of and secured to said supporting member at substantially right angles, means for clamping the upper portion of said supporting plate tightly against the vertical flange of said frame member comprising a pair of fore and aft spaced bolts carried by said supporting member and a securing plate carried by said bolts and having a portion extending downwardly on the inner side of said vertical flange below the top thereof, and means separate from said securing plate for clamping the lower portion of said supporting plate tightly against the vertical flange of said frame member.

13. The combination with a tractor having a frame including angle iron side frame members comprising a vertically extending flange and a horizontal flange extending inwardly therefrom, of an attachment comprising a generally laterally extending supporting member, a supporting plate adapted to extend fore and aft of and secured to said supporting member at substantially right angles, means for clamping the upper portion of said supporting plate tightly against the vertical flange of said frame member comprising a pair of fore and aft spaced bolts carried by said supporting member and a securing plate carried by said bolts and having a portion extending downwardly on the inner side of said vertical flange below the top edge thereof, and means for clamping the lower portion of said supporting plate tightly against the vertical flange of said frame member, said lower clamping means comprising a pair of fore and aft spaced bolts carried by said supporting member and having hook portions on their inner ends engageable over the inner edge of the horizontal flange of the frame member.

14. The combination with a tractor having a frame including angle iron side frame members comprising a vertically extending flange, of an attachment comprising a generally laterally extending supporting member, a supporting plate adapted to extend fore and aft of and secured to said supporting member at substantially right angles, means secured to the inner face of said supporting plate and adapted to rest on the upper edge of said vertical flange for supporting said supporting plate on said frame bar, means for clamping the upper portion of said supporting plate tightly against the vertical flange of said frame member comprising a pair of fore and aft spaced bolts carried by said supporting member and a securing plate carried by said bolts and having a portion extending downwardly on the inner side of said vertical flange below the top edge thereof, and means spaced from said securing plate for clamping the lower portion of said supporting plate tightly against the vertical flange of said frame member.

15. The combination with a tractor having a frame member, of an attachment comprising a generally laterally extending supporting member, a plate member secured to said supporting member and adapted to extend fore and aft at substantially right angles and having means at its upper portion adapted to engage the upper edge of said frame member, a pair of bolts carried by said plate member, a second plate member supported on said bolts for engaging over the inner edge of the frame member, spring means for normally holding said plate members in spaced relation, and nuts on said bolts for drawing said plate members together against the action of said spring means for clamping the upper portion of said frame member between said plates, and means for securing the lower portion of said first plate member to the frame member.

16. The combination with a tractor having a frame member, of an attachment comprising a generally laterally extending supporting member, a plate member secured to said supporting member and adapted to extend fore and aft at substantially right angles and having means at its upper portion adapted to engage the upper edge of said frame member, a pair of bolts carried by said plate member, a second plate member supported on said bolts for engaging over the inner edge of the frame member, spring means for normally holding said plate members in spaced relation, and nuts on said bolts for drawing said plate members together against the action of said spring means for clamping the upper portion of said frame member between said plates, a pin fixedly secured to said first plate member and extending through an opening in said frame member for carrying the weight of said attachment, and means for securing the lower portion of said first plate member to the frame member.

17. The combination with a tractor having a frame member, of an attachment comprising a generally laterally extending supporting member, a plate member secured to said supporting member and adapted to extend fore and aft at substantially right angles and having means at its upper portion adapted to engage the upper edge of said frame member, a pair of bolts carried by said plate member, a second plate member supported on said bolts for engaging over the inner edge of the frame member, spring means for normally holding said plate members in spaced relation, nuts on said bolts for drawing said plate members together against the action of said spring means for clamping the upper portion of said frame member between said plates, a pin fixedly secured to said first plate member and extending through an opening in said frame member for carrying the weight of said attachment, and a pair of hook bolts carried by said first plate member and having their hooked ends engaging over the lower portion of the frame member.

18. The combination with a tractor having a frame including angle iron side frame members comprising a vertically extending flange, of an attachment comprising a generally laterally extending supporting member, a supporting plate adapted to extend fore and aft of and secured to said supporting member at substantially right angles, a pair of fore and aft spaced collars secured to the inner face of said supporting plate and adapted to rest on the upper edge of the vertical flange of said frame member, a pair of fore and aft spaced bolts carried by said supporting plate, a clamping plate fixedly secured to said bolts on the inner side of said collars and adapted to engage the inner face of said vertical flange below the upper edge thereof, a compression spring mounted in each of said collars and extending outwardly thereof for holding said clamping plate spaced from said supporting plate, and a nut threaded on the outer end of each of said bolts on the outer side of said supporting plate whereby by tightening said nuts said clamping plate and said supporting plate may be drawn toward each other against the action of said springs to tightly clamp the vertical flange of the frame member between them.

19. In an implement, a draft bar, a connecting plate secured adjacent the inner end thereof, a clamping plate carried adjacent the upper edge of said connecting plate and extending downwardly therefrom a distance substantially less than the vertical dimension of said plate, and a hook bolt loosely carried by the lower portion of said connecting plate and movable with respect thereto to provide for applying said connecting plate to an implement frame without detaching said clamping plate at the upper edge of said connecting plate.

THEOPHILUS BROWN.